J. M. WAUGH.
SPRING.
APPLICATION FILED JAN. 20, 1908.
908,716.
Patented Jan. 5, 1909.
2 SHEETS—SHEET 1.
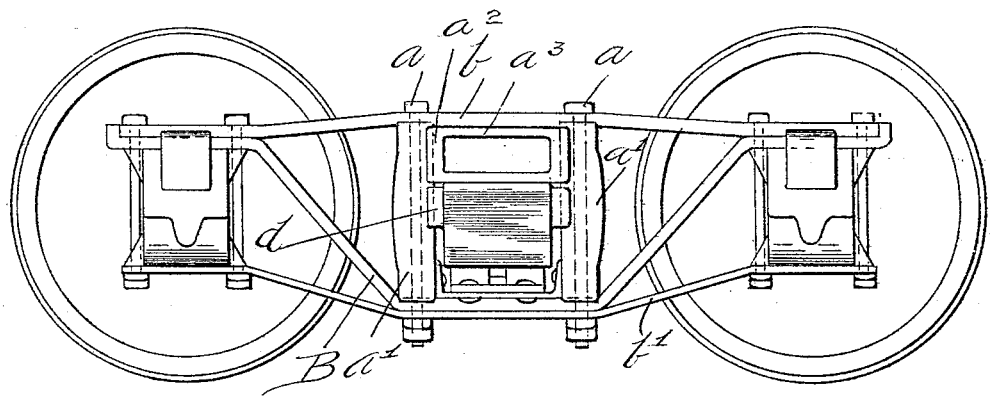
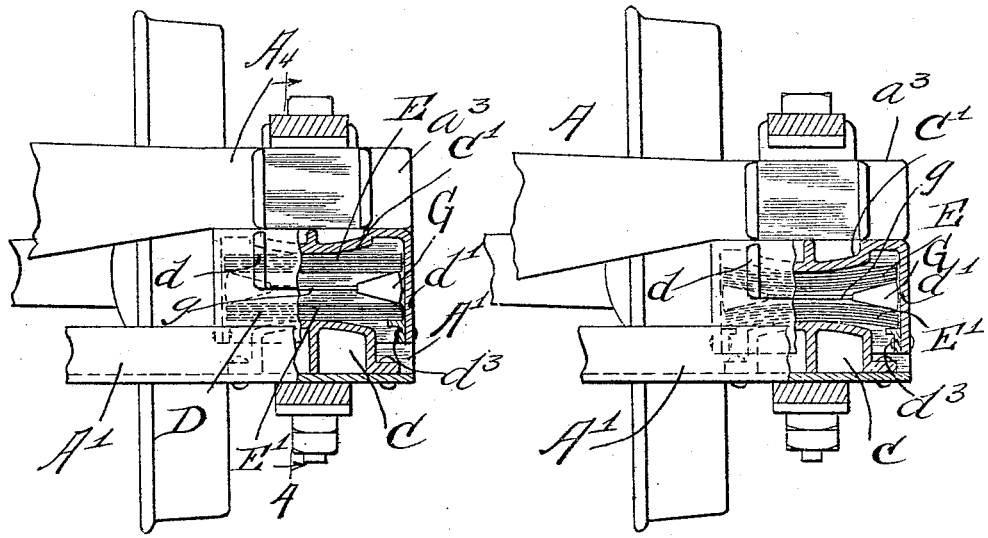
Witnesses
J. W. Angell.
R. E. Hannah
Inventor
James Mitton Waugh.
by Charles W. Hills
Atty.

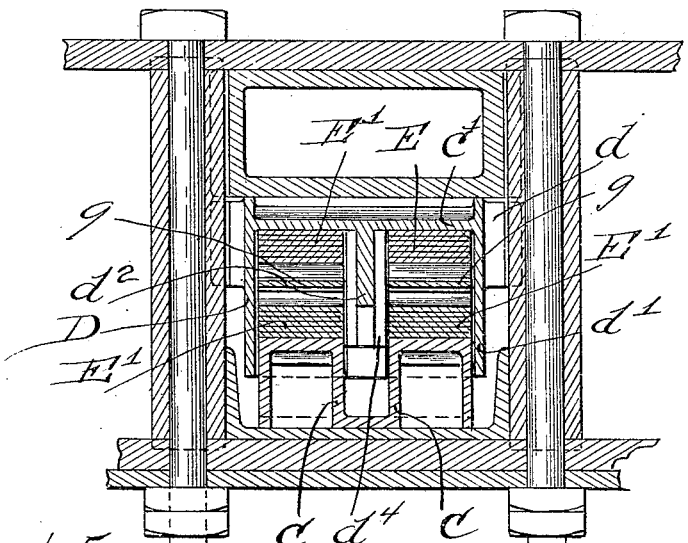
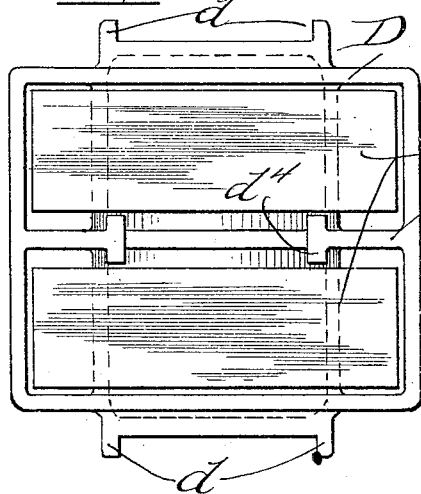
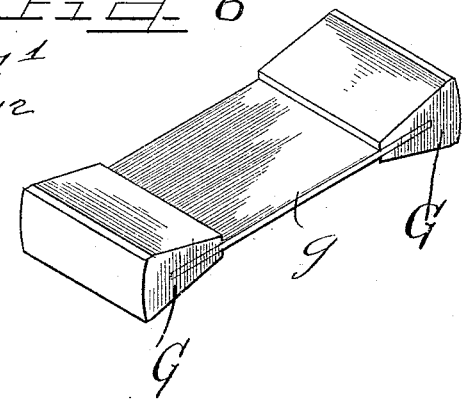

UNITED STATES PATENT OFFICE.

JAMES MILTON WAUGH, OF CHICAGO, ILLINOIS.

SPRING.

No. 908,716.  Specification of Letters Patent.  Patented Jan. 5, 1909.

Application filed January 20, 1908. Serial No. 411,575.

*To all whom it may concern:*

Be it known that I, JAMES MILTON WAUGH, a citizen of the United States, and a resident of Chicago, Cook county, Illinois, have invented certain new and useful Improvements in Springs; and I do hereby declare that the following is a full, clear, and exact description of the same, reference being had to the accompanying drawings, and to the letters of reference thereon, which form a part of this specification.

This invention is shown more particularly embodied as a railway truck spring, though adaptable for many other purposes.

Heretofore none of the springs extensively used for truck springs whether applied beneath the truck bolster or in the pedestal, or as an equalizing spring have satisfactorily carried the loads imposed thereon and sustained the constant vibration and shock due to the movement of the trucks or car along the track and in coupling. In consequence such springs though practically never loaded to near their elastic limit, soon lose their resiliency to such an extent as to prove of little value either in relieving the truck from the injurious effects of such vibration and shock or relieving the roadbed from injury from the same cause. Crystallization of axles, car wheels, and other parts of the truck inevitably results causing large expense for renewals and what is more serious, causing a very large percentage of railway accidents.

The object of this invention is to provide a spring capable of perfectly absorbing the vibration and shock due to inequality in the track or other causes with a minimum vertical vibration of the car body.

It is also an object of the invention to minimize the recoil following such shock and to provide a spring construction in which practically any desired resistance, resiliency and capacity for shock absorption may be secured by varying the number of interchangeable, duplicate parts used in constructing the springs and also to provide a construction in which though a high degree of resiliency is assured, the vibration and shock received is in large part absorbed frictionally, the spring also frictionally absorbing much of the attendent recoil.

Furthermore it is an object of the invention to provide a construction capable of being inserted in the space between the bolster and spring plank, and between the column bars of any standard truck, thereby obviating the necessity of any change in standard and adapting the springs as well to old trucks as to new.

For the purposes of illustration the invention is shown applied as the truck bolster springs in a standard diamond arch bar truck though obviously, the particular construction of the truck is immaterial and the springs are as conveniently inserted in the pedestals of other trucks.

The invention consists in the matters hereinafter described and more fully pointed out and defined in the appended claims.

In the drawings: Figure 1 is a side elevation with parts omitted of a car truck provided with springs embodying my invention. Fig. 2 is a transverse, vertical section taken along the sides of the bolster and showing the spring plank spring seat and spring casing partly in section and the springs at normal. Fig. 3 is a similar view showing the springs under maximum compression. Fig. 4 is an enlarged section on line 4—4 of Fig. 2. Fig. 5 is an enlarged bottom plan view of the spring casing showing the same removed from the truck. Fig. 6 is an enlarged perspective view of one of the spacing blocks.

As shown in the drawings: A and A' indicate respectively the truck bolster and spring plank of the truck, which for convenience is shown as a standard diamond arch bar truck. The spring plank A' as shown, is bolted or riveted through the inverted arch bar B, and pedestal tie bar $b'$. The column bolts $a$ extend as is usual through the arch bar $b$, inverted arch bar B and pedestal tie rod $b'$ on each side of the bolster and spring plank and secured thereon are the column guide bars $a'$, which bear closely against the side of the bolster and to which the flanges of the spring plank, in this instance shown as an inverted channel bar, are rigidly secured by riveting or the like. Rgidily secured within the channel of the spring plank as shown in Figs. 2, 3 and 4, is a bolster spring seat C, which, in the construction shown, comprises a casting usually of malleable iron or steel, which extends above the spring plank for a slight distance and at its top is rounded or convex in an arc approximating the arc of the springs under maximum compression. The axis of said convexity is directed longitudinally the truck. As shown, inasmuch as the spring is constructed of two duplicate sets side by side, two of said convex or rounded seats are provided and these may or may not be cast or constructed integrally, as preferred.

Seated above the bolster spring seat C and bearing against and supporting the bolster, is the spring casing D. This, as shown, is rectangular in form and is provided on opposite sides with protruding flanges $d$, between which engage the column guide bar. In the top of said casing inverted spring seats C' are provided which are shaped to correspond with the bolster spring seat C, secured on the spring plank. These are directly above the bolster spring seats and have downwardly directed, convex surfaces which bear on the middle portion of the springs. The walls of said spring casing D extend downwardly as shown in Fig. 4 to a point below the top of the bolster spring seat C, and extending transversely said casing is a central partition $d^2$, separating the casing into two spring chambers or compartments. As shown, the outer wall $d'$ of the spring casing, when said casing is in place between said bolster and spring plank, lies approximately in the vertical plane of the bolster end cap $a^3$, if one is used, and the ends of the spring plank extend outwardly flush therewith affording practically a smooth finish.

In each compartment of the spring casing, as shown, is arranged a plurality of sets of duplicate, rectangular spring plates of uniform thickness. The number of said plates, of course, will vary with the load the springs are intended to sustain. In the construction shown each of said compartments is provided with two sets E—E' of six leaves or plates each, between which is a spacing member comprising a web $g$ of sheet steel or other suitable material on each end of which is an inwardly tapering, wedge shaped, spacing block G. The taper of said spacing block is such as to permit the set of springs above and below the same, when under compression, to spring inwardly nearly to said web $g$, as shown in Fig. 3. As shown an angle bar or stop $d^3$ is riveted into each end of said casing for the ends of the lower plates of the lower set of springs E' in each compartment to bear thereon, as shown in Figs. 2 and 3. This facilitates assembling and also serves as a stop for the ends of said lower spring plates and necessitates equal bending of the springs of each set.

The operation is as follows: Having applied the casing containing the spring plates sections or cushioning plates as before described, either in an old car truck or in a new truck, the lower sections E' are supported centrally upon the bolster spring seat C, while the weight supported on the bolster is transmitted to the middle of the upper set of plates E, the ends of which are supported on the ends of the section E' by the spacing blocks G. Where two complete sets of springs are used they are separated by the partition $d^2$ which may have one or more projections or lateral webs or ribs $d^4$, which together with the sides of the casing, serve to maintain the plates of the respective sets at all times in proper position.

With the load supported and the springs in normal position as shown in Fig. 2, the vibration due to the movement of the car upon the track is absorbed readily by the respective spring plates comprising the respective sets of springs. These act not only through their resiliency for that purpose but as well acting frictionally for, obviously, with the flat faces of the plates lying in contact under pressure for their entire areas, much friction is produced when pressure is applied to said springs tending to compress the same. In other words, advantage is taken of the large area exposed to friction to assist in absorbing the ordinary or extraordinary shock and vibrations due to the movement of the truck on the track. As the compression of the springs increases the distances between the bearing or contact points near the ends of the sections and near the middle decreases as shown in Fig. 3, with the effect of very greatly increasing the resistance to further compression, in consequence this shortening of contact distance and the increasing friction resistance absorbs even the most excessive shocks without approximating the elastic limit of the spring plates. In the same manner after absorption of the shock, the recoil of the springs (which of course, like the compression is to an extent dependent on the number and size and quality of the plates comprising each set) is materially reduced and absorbed by the slight slippage of one plate upon another due to the flection of the plates so that violent recoil is impossible. Instead the springs gently raise the bolster to normal until again subjected to compressive shocks.

Of course, I am aware that the arrangement, the number and the form of the individual plates and the grouping of plates may be varied. I therefore do not purpose limiting this application for patent otherwise than necessitated by the prior art.

I claim as my invention:

1. A spring comprising a plurality of flat plates in contact for their entire adjacent surfaces, a rounded bearing member engaging intermediate the ends thereof, an inclined movable member on which the ends of the plates are supported the bearing member and inclined member being so shaped that distance between contacts decreases as compressive stress increases.

2. A spring embracing a plurality of groups of superposed, duplicate, flat plates in frictional contact for the whole of their adjacent faces, an inclined block for supporting each end of one group of plates, on the ends of another group, means supporting said last named group of springs at the ends, a convex bearing member bearing oppositely against the middle of each group, the curvature thereof and the inclination of the blocks being such that distance between central and end contacts rapidly decreases as the spring is compressed, thereby increasing resistance, and friction between the plates.

3. A spring embracing oppositely disposed upper and lower seats, groups of duplicate, flat, resilient plates interposed between said seats and on which said seats press oppositely, tapering removable spacing blocks engaging between the groups at the ends thereof, said spacing blocks being so arranged and shaped relatively each other and the seats that the distance between the bearings on said seats and spacing blocks decreases as compression increases, thereby increasing frictional resistance and also resistance to compression.

4. A spring embracing oppositely disposed upper and lower elongated, convex seats directed longitudinally of the truck, groups of resilient, flat plates interposed between said seats, the plates of each group in frictional contact for approximately their entire extent, inwardly facing, tapering, spacing blocks engaging between the end of each group, a flat plate or web connecting the spacing blocks, said seats and said spacing blocks being so arranged and shaped relatively each other that adjacent ends slightly overlap whereby distance between the bearing on said seats and spacing blocks decreases as compression increases, thereby increasing resistance to compression and frictional resistance.

5. A vertically acting spring embracing two groups of resilient, flat, duplicate plates, one superposed on the other, connected inwardly tapering spacing blocks separating said groups and supporting one on the ends of the other, an elongated convex seat on which the lower group rests at its middle, a corresponding convex bearing member resting on the middle of the upper group and carrying the load whereby the distance between the bearings on said seat and bearing and said spacing blocks decreases as compression increases, thereby acting with increasing frictional resistance to increase resistance to compression and absorb recoil.

6. A spring embracing oppositely disposed upper and lower elongated convex seats, a casing integral with one of the same, groups of resilient flat plates in frictional contact in each group interposed between said seats, inwardly tapering spacing blocks engaging between the end of said groups, said seats and said spacing blocks being of such length and shape relatively each other that distance between the bearing on said seats and spacing blocks decreases as friction and compression increases, thereby increasing resistance to compression and absorbing recoil.

7. The combination with a car truck, its bolster, spring blank, and the column bars on opposite sides thereof, of a casing seated to slide vertically between the column bars and affording in its top a downwardly convex bearing, a convex bolster spring seat secured on the spring plank beneath said convex bearing, groups of flat, duplicate plates in said casing in frictional bearing in each group and bearing oppositely on the spring seat and said upper bearing, spacing blocks engaged between the ends of each group, and a rigid stop on the lower flange of the casing upon which the ends of the lower group rest.

8. The combination with a car truck, its bolster, spring plank and the column bars on opposite sides thereof of a casing fitted to slide vertically between the column bars and affording in its top a downwardly, convex, elongated bearing, a convex bolster spring seat secured on the spring plank beneath said convex bearing, groups of flat, duplicate plates in said casing in friction bearing in each group and bearing on the spring seat and said upper bearing, inwardly tapering, connected spacing blocks engaged between the ends of the groups and supporting the upper group on the lower group and a rigid stop on the lower flange of the casing upon which the ends of the lower group of plates rests.

9. The combination with a car truck, its bolster, spring plank and its column bars on opposite sides thereof of a downwardly opening casing fitted to slide vertically between the column bars, a downwardly convex, elongated bearing, in the top of the casing, a corresponding convex bolster spring seat, secured on the spring plank beneath said convex bearing, flat duplicate plates in frictional bearing for their entire surface on adjacent sides and arranged in distinct groups in said casing, one bearing on the spring seat, the other supporting said upper bearing, inwardly tapering, connected spacing blocks engaged between the ends of said groups, a rigid stop on the lower flange of the casing upon which the ends of the lower group of spring plates rest, said convex bearing and seat and spacing blocks being so proportioned as to increase friction and resistance to compression as the load increases.

10. In a device of the class described the combination with a car truck of a spring casing interposed to support the superposed weight and substantially rectangular in form and affording a plurality of parallel spring compartments, a central, convex, downwardly facing bearing in each compartment and an inwardly projecting stop on the lower edge of the casing adapted to afford a support for the ends of the springs.

11. In a device of the class described the combination with a car truck of a spring casing interposed in the frame to support the superposed weight, and substantially rectangular in form and affording a plurality of parallel spring compartments directed longitudinally the bolster, a central, elongated, convex downwardly facing bearing in each compartment, a corresponding bearing or seat on the frame, flat, duplicate plates arranged in groups in each compartment, inwardly tapering, spacing blocks separating the upper from the lower groups and inwardly projecting stops on the lower edge of the casing adapted to afford a support for the ends of the lower group of springs in each compartment.

12. In a device of the class described the combination with a car truck of a spring casing interposed in the frame to support the superposed weight and substantially rectangular in form and affording a plurality of parallel spring compartments, directed longitudinally the bolster, a central, convex, downwardly facing bearing extended longitudinally in each compartment, a corresponding bearing on the frame and two groups of flat, straight, resilient frictionally engaging plates in each compartment engaged centrally between said bearings, a tapering spacing block between the ends of the groups and stops on the casing on which the ends of the lower group rest.

13. In a device of the class described the combination with convex spring seats of a casing adapted to fit over the same and between the column bars, parallel, central convex bearings therein directly above the spring seats, a longitudinal partition in said casing between said seats and bearings, upper and lower groups of frictionally engaging duplicate spring plates in each compartment respectively engaged centrally by the bearing in the casing and on the spring seat, and connected inwardly tapering, spacing blocks engaged between the ends of each pair of groups and stops at the bottom of the casing on which the ends of the lower groups rest.

14. A spring comprising upper and lower elongated convex bearings, inwardly tapering connected spacing blocks and two groups of unconnected duplicate flat plates in frictional bearing in each group for their entire adjacent surface and separated by the spacing blocks, said groups being oppositely engaged centrally by said convex bearings.

15. A spring comprising straight, flat, resilient unconnected plates in frictional bearing for their entire adjacent surfaces, inwardly tapering loosely supported blocks on which the ends of the group of plates rests, and an elongated convex bearing supported on the middle of said group, said blocks and said bearing being so proportioned that distance between bearing contacts decreases as compression increases.

16. In a device of the class described a casing, a group of springs therein adapted one to slide over another, movable means supporting the group of springs at the ends thereof, a group of springs supporting said means and means rigidly secured to the casing for supporting the second named group of springs at the ends thereof.

17. In a device of the class described a casing, a group of springs therein adapted one to slide over another, movable means supporting the group of springs at the ends thereof, a group of springs supporting said means, means rigidly secured to the casing for supporting the second named group of springs at the ends thereof, and convex bearing members, one movable and the other nonmovable.

18. In a device of the class described a movable casing, a bearing member movable therewith, a group of spring plates bearing at the center against said bearing member, an inclined spacing block supporting each end of the group of plates, a group of spring plates supporting the spacing blocks and means supporting the second named group of plates at the ends thereof.

19. In a device of the class described a movable casing, a bearing member movable therewith, a group of spring plates bearing at their center against said bearing member, an inclined facing block supporting each end of the group of plates, a group of spring plates supporting the spacing blocks, means supporting the second named group of plates at the ends thereof and a rigidly supported bearing member supporting the second named group of plates at the middle thereof.

20. In a device of the class described a casing, a plurality of groups of spring plates therein and a spacing member between the groups of spring plates and movable to equalize the strain on all the groups of springs.

21. In a device of the class described a casing, groups of independently movable springs therein comprising plates in frictional engagement, bearing members in the casing convex on the side adjacent the respective group of springs, and movable spacing members in the casing separating one group of springs from another adapting the middle of the groups to compress toward each other.

22. In a device of the class described a casing, superposed groups of springs therein, independent means supporting each group of springs at the ends only and bearing members each convex on its side facing the adjacent group and bearing against the outer side of the respective group at the center thereof and one of said bearing members movable with the casing, the other stationary.

23. In a device of the class described a movable housing, a plurality of groups of springs therein, spacing blocks loosely engaged in the casing separating the groups of springs and supporting the upper group at the ends thereof, means supporting the lower group of springs at the end thereof, and means for compressing the groups of springs centrally.

24. In a device of the class described a casing, oppositely disposed groups of superposed groups of spring plates in said casing, a guide separating the oppositely disposed groups of spring plates, means separating the superposed groups of plates and a convex bearing member bearing against each group of plates.

In testimony whereof I have hereunto subscribed my name in the presence of two subscribing witnesses.

JAMES MILTON WAUGH.

Witnesses:
K. E. HANNAH,
LAWRENCE REIHTEIN.